US006815494B2

(12) United States Patent
Wigger et al.

(10) Patent No.: US 6,815,494 B2
(45) Date of Patent: Nov. 9, 2004

(54) AQUEOUS COATING MATERIAL, ESPECIALLY AQUEOUS FILLER OR PROTECTIVE BASE AGAINST STONES

(75) Inventors: Georg Wigger, Senden (DE); Ulrike Röckrath, Senden (DE); Bärbel Wiatr, Münster (DE); Marita Schilling, Münster (DE); Ralf Stein, Münster (DE)

(73) Assignee: BASF Coatings AG, Munster (DE)

( * ) Notice: Subject to any disclaimer, the term of this patent is extended or adjusted under 35 U.S.C. 154(b) by 23 days.

(21) Appl. No.: 10/396,893

(22) Filed: Mar. 25, 2003

(65) Prior Publication Data

US 2003/0185991 A1 Oct. 2, 2003

Related U.S. Application Data

(63) Continuation of application No. 10/018,155, filed as application No. PCT/EP00/06106 on Jun. 30, 2000, now Pat. No. 6,620,511.

(30) Foreign Application Priority Data

Jul. 2, 1999 (DE) .......................................... 199 30 555

(51) Int. Cl.$^7$ ................................................. C08J 3/03
(52) U.S. Cl. ....................... 524/591; 524/839; 524/840; 524/500; 524/501; 524/539; 524/542; 427/385.5
(58) Field of Search ................................. 524/591, 839, 524/840, 501, 539, 542; 427/385.5

(56) References Cited

U.S. PATENT DOCUMENTS

| | | | | |
|---|---|---|---|---|
| 3,361,844 | A | 1/1968 | Hoewschele et al. ........ | 260/858 |
| 4,444,954 | A | 4/1984 | Mels et al. .................. | 525/124 |
| 4,489,135 | A | 12/1984 | Drexler et al. ............ | 428/423.1 |
| 4,710,542 | A | 12/1987 | Forgione et al. ............ | 525/127 |
| 4,968,536 | A | 11/1990 | Goldner et al. ............ | 427/388.4 |
| 5,028,639 | A | 7/1991 | Treutlein et al. ............ | 523/200 |
| 5,126,393 | A | 6/1992 | Blum et al. .................. | 524/538 |
| 5,210,154 | A | 5/1993 | Weidemeier et al. ........ | 525/438 |
| 5,521,247 | A * | 5/1996 | Dobler et al. ................ | 524/591 |
| 5,569,707 | A * | 10/1996 | Blum et al. .................. | 524/591 |
| 5,707,941 | A | 1/1998 | Häberle ........................ | 528/44 |
| 6,472,465 | B1 * | 10/2002 | Hille et al. .................. | 524/591 |

FOREIGN PATENT DOCUMENTS

| | | | |
|---|---|---|---|
| CA | 2033530 | 7/1991 | ........... C09D/17/04 |
| CA | 1291290 | 10/1991 | ............ C09D/3/58 |
| CA | 2086156 | 12/1992 | ......... C09D/175/04 |
| CA | 2 102 169 | 11/1993 | ......... C09D/175/14 |
| CA | 2169095 | 6/1995 | ............ C09D/7/00 |
| DE | 1 793 785 | 12/1965 | |
| DE | 1 618 795 | 6/1967 | |
| DE | 31 08 861 C2 | 9/1982 | ......... C09D/167/00 |
| DE | 38 05 629 C1 | 2/1988 | ............ B05D/7/26 |
| DE | 36 36 183 A1 | 3/1988 | ............ C09D/5/38 |
| DE | 41 42 816 C1 | 12/1991 | ......... C09D/175/04 |
| DE | 44 14 032 A1 | 4/1994 | ........... C08G/18/75 |
| DE | 195 04 947 A1 | 2/1995 | ......... C09D/201/00 |
| EP | 0 38 127 | 3/1981 | ............ B05D/7/26 |
| EP | 0 089497 | 2/1983 | ............ C09D/3/72 |
| EP | 0 245 700 | 4/1987 | ......... C07D/251/54 |
| EP | 0 276 501 | 9/1987 | ............ C11D/1/42 |
| EP | 0 269 828 A1 | 10/1987 | ............ C09D/3/58 |
| EP | 249 201 | 12/1987 | ........... C08G/59/24 |
| EP | 0 354 261 | 8/1988 | ........... C08G/18/50 |
| EP | 0 339433 A2 | 4/1989 | ........... C08G/18/08 |
| EP | 0 424705 A2 | 10/1990 | .......... C08F/283/00 |
| EP | 0427 028 A1 | 10/1990 | ........... C08G/18/66 |
| EP | 0 436 941 A1 | 12/1990 | ......... C09D/175/04 |
| EP | 0 517 707 | 1/1991 | ............ B05D/7/16 |
| EP | 0 596460 | 11/1993 | ......... C09D/201/00 |
| EP | WO94/22968 | 10/1994 | ......... C09D/133/06 |
| EP | WO97/12945 | 4/1997 | ............ C09D/7/12 |
| EP | WO97/49745 | 12/1997 | ........... C08G/18/75 |
| EP | WO97/49747 | 12/1997 | ........... C08G/18/75 |
| GB | 1127338 | 6/1967 | ......... C07C/119/04 |
| GB | 1220717 | 9/1968 | ........... H01F/27/00 |

* cited by examiner

Primary Examiner—David J. Buttner
Assistant Examiner—Christopher Keehan

(57) ABSTRACT

Aqueous coating material comprising (A) water-dispersible hydroxy-functional binder component containing urethane groups, (B) water-dispersible binder component containing urethane groups and blocked isocyanate groups, (C) water-dispersible amino resin, and optionally (D) water-dispersible hydroxy-functional polyester, the binder component (B) being preparable by (B1) preparing a polyurethane prepolymer containing isocyanate groups from at least one polyol and at least one polyisocyanate, (B2) reacting the polyurethane prepolymer (B1) containing isocyanate groups with a chain extender to give a hydroxyl-containing chain-extended polyurethane prepolymer, (B3) reacting the hydroxyl-containing chain-extended polyurethane prepolymer (B2) with at least one polyisocyanate to give a further polyurethane prepolymer containing isocyanate groups, and (B4) blocking some or all of the isocyanate groups of the chain-extended polyurethane prepolymer (B3) containing isocyanate groups with a blocking agent to give a polyurethane containing blocked isocyanate groups, and then, where appropriate, (B5) reacting remaining free isocyanate groups in the polyurethane (B4) with a chain extender.

17 Claims, No Drawings

AQUEOUS COATING MATERIAL, ESPECIALLY AQUEOUS FILLER OR PROTECTIVE BASE AGAINST STONES

CROSS-REFERENCE TO RELATED APPLICATIONS

This application is a continuation of U.S. Ser. No. 10/018,155, now U.S. Pat. No. 6,620,511 filed on Dec. 14, 2001, which is a 371 National Stage Application of PCT/EP00/06106, filed 30 Jun. 2000, which claims priority to DE 199 30 555.2, filed 2 Jul. 1999. U.S. Ser. No. 10/018,155, now U.S. Pat. No. 6,620,511 is incorporated herein by reference.

The invention relates to an aqueous coating material, especially an aqueous surfacer or antistonechip primer, comprising (A) a water-dispersible hydroxy-functional binder component containing urethane groups, (B) a water-dispersible binder component containing urethane groups and blocked isocyanate groups, (C) a water-dispersible amino resin, (D) optionally, a water-dispersible hydroxy-functional polyester, and (E) optionally, customary coatings additives. The invention further relates to a process for preparing such a coating material and to the uses thereof.

The provision of stonechip-resistant coatings on metallic substrates is of particular importance in the field of motor vehicle production. Stonechip-resistant coatings are applied in particular in the front area and in the underbody area of a motor vehicle body. For reasons both economic and environmental, a coating material suitable for this purpose ought to contain little or no organic solvents. Only (apart from powder coating materials) aqueous coating materials are suitable for this purpose.

A surfacer or antistonechip primer is subject to a number of requirements. It must be bakeable at a temperature of 120–160° C. and after baking at such temperatures must exhibit outstanding properties such as high stonechip resistance (particularly the combination of multiple and single chipping), effective adhesion to the primer coat, a cathodic electrode coat, for example, and to the base coat, good filling properties (masking of the structure of the substrate) at a coat thickness of 20–35 µm, and an excellent appearance in the final clearcoat. The combination of these properties is difficult to realize on account of the fact that they are in part divergent properties, where improving one property automatically results in a deterioration in another property. Such divergent or contradictory properties are, for example, very good resistance to multiple chipping and to single chipping, low coat thickness and very good filling power/topcoat appearance, low baking temperature and very good topcoat appearance, and low baking temperature and high adhesion.

A coating material of the composition specified at the outset is known from the reference EP 0 427 028 B1. In this material, component (B) is the reaction product of a diisocyanate and a low molecular mass polyol. With the known coating material, not all of the abovementioned divergent properties are obtained to a satisfactory extent. For a solventborne antistonechip primer, refer, for example, to the reference DE 31 08 861 C2. Solventborne coating materials are unsatisfactory on environmental grounds alone. The reference DE 41 42 816 C1 discloses a surfacer for which the abovementioned components (A) and (B) are first of all reacted with one another and then the reaction product is mixed with a polyisocyanate and a melamine resin to give the application-ready coating material. Technically speaking, this is a comparatively laborious preparation. Moreover, even with the known coating material, not all of the abovementioned divergent properties are realized to a sufficient extent. Further stonechip protection compositions are known, for example, from the references DE 38 05 629 C1 and DE 195 04 947 A1.

In opposition to the prior art specified at the outset, the technical problem on which the invention is based is to specify a coating material with which the desired divergent properties mentioned are obtained in a way which, overall, meets all of the requirements.

To solve this technical problem, the invention teaches that the binder component (B) specified at the outset is preparable by (B1) preparing a polyurethane prepolymer containing isocyanate groups from a polyol or mixture of polyols and from a polyisocyanate or mixture of polyisocyanates, (B2) reacting the polyurethane prepolymer (B1) containing isocyanate groups by means of a chain extender to give a hydroxyl-containing chain-extended polyurethane prepolymer, (B3) reacting the hydroxyl-containing chain-extended polyurethane prepolymer (B2) with a polyisocyanate or mixture of polyisocyanates to give a further polyurethane prepolymer containing isocyanate groups, and (B4) blocking some or all of the isocyanate groups of the chain-extended polyurethane prepolymer (B3) containing isocyanate groups with a blocking agent to give a polyurethane containing blocked isocyanate groups, and then, where appropriate, (B5) reacting remaining free isocyanate groups in the polyurethane (B4) with a chain extender.

Surprisingly, using the above-defined component (B) for use in accordance with the invention in the coating material specified at the outset, comprising components (A) and (C) and also, where appropriate, (D) and (E), gives a coating material which satisfies all of the requirements.

The binder component (B) for use in accordance with the invention is obtainable by reacting, in a first process step, at least one polyol with at least one polyisocyanate to give the polyurethane prepolymer (B1) containing isocyanate groups.

Examples of suitable polyols are saturated or olefinically unsaturated polyesterpolyols having a number-average molecular weight of from 300 to 5000, preferably from 1000 to 2000, and in particular from 1200 to 1600, which are prepared by reacting sulfonated or unsulfonated saturated and/or unsaturated polycarboxylic acids or their esterifiable derivatives, together if desired with monocarboxylic acids, and saturated and/or unsaturated polyols, together if desired with monools.

Examples of suitable polycarboxylic acids are aromatic, aliphatic and cycloaliphatic polycarboxylic acids. Preference is given to using aromatic and/or aliphatic polycarboxylic acids.

Examples of suitable aromatic polycarboxylic acids are phthalic acid, isophthalic acid, terephthalic acid, phthalic, isophthalic or terephthalic monosulfonate, or halophthalic acids, such as tetrachloro- and/or tetrabromophthalic acid, of which isophthalic acid is advantageous and is therefore used with preference.

Examples of suitable acyclic aliphatic or unsaturated polycarboxylic acids are oxalic acid, malonic acid, succinic acid, glutaric acid, adipic acid, pimelic acid, suberic acid, azelaic acid, sebacic acid, undecanedicarboxylic acid, dodecanedicarboxylic acid or dimer fatty acids or maleic acid, fumaric acid or itaconic acid, of which adipic acid, glutaric acid, azelaic acid, sebacic acid, dimer fatty acids and maleic acid are advantageous and therefore used with preference.

Examples of suitable cycloaliphatic and cyclic unsaturated polycarboxylic acids are 1,2-cyclobutanedicarboxylic acid, 1,3-cyclobutanedicarboxylic acid, 1,2-cyclopentanedicarboxylic acid, 1,3-cyclopentanedicarboxylic acid, hexahydrophthalic acid, 1,3-cyclohexanedicarboxylic acid, 1,4-cyclohexanedicarboxylic acid, 4-methylhexahydrophthalic acid, tricyclodecanedicarboxylic acid, tetrahydrophthalic acid or 4-methyltetrahydrophthalic acid. These dicarboxylic acids may be used both in their cis and in their trans form and also as a mixture of both forms.

Also suitable are the esterifiable derivatives of the abovementioned polycarboxylic acids, such as, for example, their monoesters or polyesters with aliphatic alcohols having from 1 to 4 carbon atoms or hydroxy alcohols having from 1 to 4 carbon atoms. Moreover, it is also possible to use the anhydrides of the abovementioned polycarboxylic acids, where they exist.

If desired it is possible, together with the polycarboxylic acids, to use monocarboxylic acids too, such as benzoic acid, tert-butylbenzoic acid, lauric acid, isononanoic acid, fatty acids of naturally occurring oils, acrylic acid, methacrylic acid, ethacrylic acid or crotonic acid, for example. As monocarboxylic acid it is preferred to use isononanoic acid.

Examples of suitable polyols are diols and triols, especially diols. Normally, triols are used in minor amounts alongside the diols in order to introduce branches into the polyesterpolyols.

Suitable diols are ethylene glycol, 1,2- or 1,3-propanediol, 1,2-, 1,3- or 1,4-butanediol, 1,2-, 1,3-, 1,4- or 1,5-pentanediol, 1,2-, 1,3-, 1,4-, 1,5- or 1,6-hexanediol, neopentyl hydroxypivalate, neopentyl glycol, diethylene glycol, 1,2-, 1,3- or 1,4-cyclohexanediol, 1,2-, 1,3- or 1,4-cyclohexanedimethanol, trimethylpentanediol, ethylbutylpropanediol, or the positionally isomeric diethyloctanediols. These diols may also be used per se for the preparation of the polyurethanes (A) for inventive use.

Further examples of suitable diols are diols of the formula I or II:

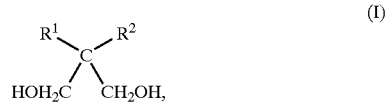

in which $R^1$ and $R^2$ each represent an identical or different radical and stand for an alkyl radical having from 1 to 18 carbon atoms, an aryl radical or a cycloaliphatic radical, with the proviso that $R^1$ and/or $R^2$ may not be methyl;

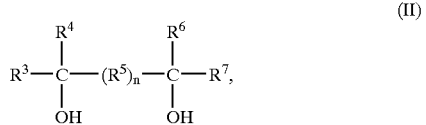

in which $R^3$, $R^4$, $R^6$ and $R^7$ each represent identical or different radicals and stand for an alkyl radical having from 1 to 6 carbon atoms, a cycloalkyl radical or an aryl radical and $R^5$ represents an alkyl radical having from 1 to 6 carbon atoms, an aryl radical or an unsaturated alkyl radical having from 1 to 6 carbon atoms, and n is either 0 or 1.

Suitable diols I of the general formula I are all propanediols of the formula in which either $R^1$ or $R^2$ or $R^1$ and $R^2$ is not equal to methyl, such as 2-butyl-2-ethylpropane-1,3-diol, 2-butyl-2-methylpropane-1,3-diol, 2-phenyl-2-methylpropane-1,3-diol, 2-propyl-2-ethylpropane-1,3-diol, 2-di-tert-butylpropane-1,3-diol, 2-butyl-2-propylpropane-1,3-diol, 1-dihydroxymethylbicyclo[2.2.1]heptane, 2,2-diethylpropane-1,3-diol, 2,2-dipropylpropane-1,3-diol or 2-cyclohexyl-2-methylpropane-1,3-diol and others, for example.

As diols II of the general formula II it is possible, for example, to use 2,5-dimethylhexane-2,5-diol, 2,5-diethylhexane-2,5-diol, 2-ethyl-5-methylhexane-2,5-diol, 2,4-dimethylpentane-2,4-diol, 2,3-dimethylbutane-2,3-diol, 1,4-(2'-hydroxypropyl)benzene and 1,3-(2'-hydroxypropyl)benzene.

Of these diols, hexanediol and neopentyl glycol are particularly advantageous and are therefore used with particular preference.

The abovementioned diols may also be used per se for the preparation of the polyurethane prepolymers (B1) containing isocyanate groups.

Examples of suitable trials are trimethylolethane, trimethylolpropane or glycerol, especially trimethylolpropane.

The abovementioned triols may also be used per se for the preparation of the polyurethane prepolymers (B1) containing isocyanate groups (cf. the patent EP-A-0 339 433).

If desired, minor amounts of monools may be used as well. Examples of suitable monools are alcohols or phenols such as ethanol, propanol, n-butanol, sec-butanol, tert-butanol, amyl alcohols, hexanols, fatty alcohols, allyl alcohol or phenol.

Especially advantageous polyesterpolyols result if the monomers are selected from the group consisting of isophthalic acid, dimer fatty acids, and hexanediol.

The polesterpolyols may be prepared in the presence of small amounts of an appropriate solvent as entrainer. Entrainers used include, for example, aromatic hydrocarbons, such as particularly xylene and (cyclo) aliphatic hydrocarbons, e.g., cyclohexane or methylcyclohexane.

Further examples of suitable polyols are polyesterdiols which are obtained by reacting a lactone with a diol. They are notable for the presence of terminal hydroxyl groups and repeating polyester units of the formula —(—CO—(CHR$^8$)$_m$—CH$_2$—O—)—. In this formula the index m is preferably from 4 to 6 and the substituent $R^8$=hydrogen, an alkyl, cycloalkyl or alkoxy radical. No one substituent contains more than 12 carbon atoms. The total number of carbon atoms in the substituent does not exceed 12 per lactone ring. Examples thereof are hydroxycaproic acid, hydroxybutyric acid, hydroxydecanoic acid and/or hydroxystearic acid.

For the preparation of the polyesterdiols preference is given to the unsubstituted epsilon-caprolactone, in which m has the value 4 and all $R^8$ substituents are hydrogen. The reaction with lactone is started by low molecular mass polyols such as ethylene glycol, 1,3-propanediol, 1,4-butanediol or dimethylolcyclohexane. It is, however, also possible to react other reaction components, such as ethylenediamine, alkyldialkanolamine or else urea, with caprolactone. Further suitable high molecular mass diols include polylactamdiols, prepared by reacting, for example, epsilon-caprolactam with low molecular mass diols.

Further examples of suitable polyols are polyetherpolyols, especially those having a number-average molecular weight of from 400 to 5000, in particular from 400 to 3000. Highly suitable polyetherdiols are, for example, polyetherdiols of the general formula H—(O—(CHR$^9$)$_o$—)$_p$OH, in which the substituent R$^9$=hydrogen or is a lower, unsubstituted or substituted alkyl radical, the index o=2 to 6, preferably 3 to 4, and the index p=2 to 100, preferably 5 to 50. Cited as particularly highly suitable examples are linear or branched polyetherdiols such as poly(oxyethylene) glycols, poly(oxypropylene) glycols and poly(oxybutylene) glycols.

The polyetherdiols should on the one hand not introduce excessive amounts of ether groups, since otherwise the polyurethanes (B) for inventive use that are formed undergo incipient swelling in water. On the other hand, they may be used in amounts which ensures the nonionic stabilization of the polyurethanes (B). In that case they serve as the functional nonionic groups (b3) described below.

In order to ensure dispersibility of the binder component (B) for use in accordance with the invention in an aqueous medium, not only are the polyols incorporated but also compounds by means of which stabilizing (potentially) ionic and/or nonionic functional groups are introduced. Suitable groups of this kind are (b1) functional groups which can be converted into cations by neutralizing agents and/or quaternizing agents, and/or cationic groups, or (b2) functional groups which can be converted into anions by neutralizing agents, and/or anionic groups, and/or (b3) nonionic hydrophilic groups.

Examples of suitable functional groups (b1) for inventive use which may be converted into cations by neutralizing agents and/or quaternizing agents are primary, secondary or tertiary amino groups, secondary sulfide groups or tertiary phosphine groups, especially tertiary amino groups or secondary sulfide groups.

Examples of suitable cationic groups (b1) for inventive use are primary, secondary, tertiary or tertiary sulfonium groups or quaternary phosphonium groups, preferably quaternary ammonium groups or quaternary ammonium groups, tertiary sulfonium groups, but especially tertiary sulfonium groups.

Examples of suitable functional groups (b2) for inventive use which may be converted into anions by neutralizing agents are carboxylic acid, sulfonic acid or phosphonic acid groups, especially carboxylic acid groups.

Examples of suitable anionic groups (b2) for inventive use are carboxylate, sulfonate or phosphonate groups, especially carboxylate groups.

Examples of suitable neutralizing agents for functional groups (b1) convertible into cations are organic and inorganic acids such as formic acid, acetic acid, lactic acid, dimethylolpropionic acid, citric acid, sulfuric acid, hydrochloric acid or phosphoric acid.

Examples of suitable neutralizing agents for functional groups (b2) convertible into anions are ammonia, ammonium salts, such as ammonium carbonate or ammonium hydrogen carbonate, for example, and also amines, such as trimethylamine, triethylamine, tributylamine, dimethylaniline, diethylaniline, triphenylamine, dimethylethanolamine, diethylethanolamine, methyldiethanolamine, triethanolamine and the like, for example. The neutralization may take place in organic phase or in aqueous phase. A preferred neutralizing agent used is dimethylethanolamine.

The overall amount of neutralizing agent used in the coating composition of the invention is chosen so that from 1 to 100 equivalents, preferably from 50 to 90 equivalents, of the functional groups (b1) or (b2) of the polyurethane (A) for inventive use are neutralized.

Of these functional (potentially) ionic groups (b1) and (b2) and functional nonionic groups (b3), the (potentially) anionic groups (b2) are advantageous and are therefore used with particular preference.

The introduction of (potentially) anionic groups (b2) into the polyurethane molecules takes place by way of the incorporation of compounds which contain in the molecule at least one isocyanate-reactive group and at least one group capable of forming anions; the amount to be used may be calculated from the target acid number.

Examples of suitable compounds of this kind are those which contain two isocyanate-reactive groups in the molecule. Suitable isocyanate-reactive groups are, in particular, hydroxyl groups, and also primary and/or secondary amino groups. Accordingly, it is possible, for example, to use alkanoic acids having two substituents on the alpha carbon atom. The substituent may be a hydroxyl group, an alkyl group or, preferably, an alkylol group. These alkanoic acids have at least one, in general from 1 to 3, carboxyl groups in the molecule. They have from 2 to about 25, preferably from 3 to 10, carbon atoms. Examples of suitable alkanoic acids are dihydroxypropionic acid, dihydroxysuccinic acid and dihydroxybenzoic acid. One particularly preferred group of alkanoic acids are the alpha,alpha-dimethylolalkanoic acids of the general formula R$^{10}$—C(CH$_2$OH)$_2$COOH, in which R$^{10}$ stands for a hydrogen atom or an alkyl group having up to about 20 carbon atoms. Examples of especially suitable alkanoic acids are 2,2-dimethylolacetic acid, 2,2-dimethylolpropionic acid, 2,2-dimethylolbutyric acid and 2,2-dimenthylolpentanoic acid. The preferred dihydroxyalkanoic acid is 2,2-dimethylolpropionic acid. Examples of compounds containing amino groups are alpha,alpha-diaminovaleric acid, 3,4-diaminobenzoic acid, 2,4-diaminotoluenesulfonic acid and 2,4-diaminodiphenyl ether sulfonic acid.

Nonionic stabilizing poly(oxyalkylene) groups (b3) may be introduced as lateral or terminal groups into the polyurethane molecules. For this purpose it is possible, for example, to use alkoxypoly(oxyalkylene) alcohols having the general formula R$^{11}$O—(—CH$_2$—CH$^{12}$—O—)$_r$ H in which R$^{11}$ stands for an alkyl radical having from 1 to 6 carbon atoms, R$^{12}$ stands for a hydrogen atom or an alkyl radical having from 1 to 6 carbon atoms and the index r stands for a number between 20 and 75. (cf. the patents EP-A-0 354 261 or EP-A-0 424 705).

Suitable polyisocyanates include in principle all customary and known aliphatic, cycloaliphatic, aliphatic-cycloaliphatic, aromatic, aliphatic-aromatic and/or cycloaliphatic-aromatic polyisocyanates and polyisocyanate adducts that are used in the paints sector, and are also referred to as paint polyisocyanates.

Examples of suitable polyisocyanates are isophorone diisocyanate (=5-isocyanato-1-isocyanatomethyl-1,3,3-trimethylcyclohexane), 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)-cyclohexane, 1-isocyanato-2-(3-isocyanatoeth-1-yl) cyclohexane, 1-isocyanato-2-(4-isocyanatobut-1-yl) cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate, dicyclohexylmethane 4,4'-diisocyanate, liquid dicyclohexylmethanae 4,4'-diisocyanate with a trans/trans content of up to 30% by weight, preferably 25% by weight, and in particular 20% by weight, obtainable by phosgenation of isomer mixtures of bis(4-aminocyclohexyl)methane or by fractional crystallization of commercial bis(4-isocyanatocyclohexyl)methane in accordance with the patents DE-A-44 14 032, GB-A-1220717, DE-A-16 18 795 or DE-A-17 93 785; trimethylene diisocyanate, tetramethylene diisocyanate, pentamethylene diisocyanate, hexamethylene diisocyanate, ethylethylene diisocyanate, trimethylhexane diisocyanate, heptamethylene diisocyanate or diisocyanates derived from dimer fatty acids, such as are sold under the commercial designation DDI 1410 by Henkel and described in the patents WO 97/49745 and WO 97/49747, especially 2-heptyl-3,4-bis(9-isocyanatononyl)-1-pentylcyclohexane, 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatoprop-1-yl)cyclohexane, 1,2-, 1,4- or 1,3-bis(4-isocyanatobut-1-yl)cyclohexane, m-tetramethylxylylene diisocyanate (=1,3-bis(2-isocyanatoprop-2-yl)benzene or tolylene diisocyanate.

Examples of suitable polyisocyanate adducts are polyurethane prepolymers containing isocyanate groups, which may be prepared by reacting polyols with an excess of polyisocyanates and are preferably of low viscosity. It is also possible to use polyisocyanates containing isocyanurate, biuret, allophanate, iminooxadiazinedione, urethane, urea carbodiimide and/or uretdione groups. Polyisocyanates containing urethane groups, for example, are obtained by reacting some of the isocyanate groups with polyols, such as trimethylolpropane and glycerol, for example. In this case it is preferred to use the polyisocyanates described in detail above.

Very particular preference is given to using mixtures of polyisocyanate adducts containing uretdione and/or isocyanurate groups and/or allophanate groups, especially isocyanurates, based in particular on hexamethylene diisocyanate, such as are formed by catalytic oligomerization of hexamethylene diisocyanate using appropriate catalysts. The polyisocyanate constituent may otherwise also consist of any desired mixtures of the free polyisocyanates exemplified.

In the preparation of the polyurethane prepolymer (B1) containing isocyanate groups, the isocyanate groups are preferably employed in a molar excess over the hydroxyl groups. It is of advantage in accordance with the invention if the ratio of hydroxyl groups in the polyols to isocyanate groups in the polyisocyanates is from 1:6 to 1:1.1, preferably from 1:5 to 1:1.2, and in particular from 1:4 to 1:1.3. If it is ensured otherwise that the resulting polyurethane prepolymer (B1) contains isocyanate groups, it is also possible to employ the hydroxyl groups in excess.

In accordance with the invention, in a second process step, the polyurethane prepolymer (B1) containing isocyanate groups is chain extended with a suitable chain extender, so that hydroxyl groups result. Suitable chain extenders include: at least one polyol having a functionality of from 2 to 4, at least one polyamine and/or at least one alkanolamine. The use of polyols, polyamines and amino alcohols leads to the molecular weight increase of the polyurethanes (B).

Suitable polyols for the chain extension are polyols having up to 36 carbon atoms per molecule such as ethylene glycol, diethylene glycol, triethylene glycol, 1,2-propanediol, 1,3-propanediol, 1,4-butanediol, 1,2-butylene glycol, 1,6-hexanediol, trimethylolpropane, castor oil or hydrogenated castor oil, ditrimethylolpropane ether, pentaerythritol, 1,2-cyclohexanediol, 1,4-cyclohexanedimethanol, bisphenol A, bisphenol F, neopentyl glycol, neopentyl glycol hydroxypivalate, hydroxyethylated or hydroxypropylated bisphenol A, hydrogenated bisphenol A or mixtures thereof (cf. also patents EP-A-0 339 433, EP-A-0 436 941, EP-A-0 517 707).

Examples of suitable polyamines have at least two primary and/or secondary amino groups. Polyamines are essentially alkylene polyamines having from 1 to 40 carbon atoms, preferably from about 2 to 15 carbon atoms. They may carry substituents which have no hydrogen atoms that are reactive with isocyanate groups. Examples are polyamines having a linear or branched aliphatic, cycloaliphatic or aromatic structure and containing at least two primary amino groups.

As diamines, mention may be made of hydrazine, ethylenediamine, propylenediamine, 1,4-butylenediamine, piperazine, 1,4-cyclohexyldimethylamine, 1,6-hexamethylenediamine, trimethylhexamethylenediamine, menthanediamine, isophoronediamine (1-amino-3-aminomethyl-3,5,5-trimethylcyclohexane), 4,4'-diaminodicyclohexylmethane, 4,4'-diaminodicyclohexane, m-xylylenediamine, p-xylylenediamine, or isomeric octanediamines. Preferred diamines are hydrazine, alkyl- or cycloalkyldiamines such as propylenediamine and isophoronediamine.

It is also possible to use polyamines which contain more than two amino groups in the molecule. In these cases, however, it must be ensured—for example, by using monoamines as well—that crosslinked polyurethane resins are not obtained. Polyamines of this kind which can be used are diethylenetriamine, triethylenetetramine, dipropylenediamine and dibutylenetriamine. An example to be mentioned of a monoamine is ethylhexylamine (cf. also the patent EP-A-0 089 497).

Examples of suitable amino alcohols are ethanolamine, methylethanolamine, diisopropylamine, diethanolamine, N-methyldiethanolamine, hydroxyethoxyethylamine, polyetheraminols, aminomethylpropanol, trishydroxymethyl-aminomethane or triethanolamine.

Of these, the polyols having a functionality of 3 to 4 and/or the amino alcohols which contain at least two hydroxyl groups, especially diethanolamine, are of particular advantage and are therefore used with particular preference in accordance with the invention. The resulting hydroxyl-containing, chain-extended polyurethane prepolymer (B2) is reacted in a third process step with at least one polyisocyanate to give a further polyurethane prepolymer (B3) containing isocyanate groups.

Examples of suitable polyisocyanates are those described above.

In accordance with the invention, the polyurethane prepolymer (B3) containing isocyanate groups is reacted in a fourth process step with a blocking agent, so that some or all of its isocyanate groups become masked or blocked and the polyurethane (B4) containing blocked isocyanate groups, i.e., the binder component (B) for use in accordance with the invention, is the result.

Examples of suitable blocking agents are the blocking agents known from U.S. Pat. No. 4,444,954:

i) phenols such as phenol, cresol, xylenol, nitrophenol, chlorophenol, ethylphenol, t-butylphenol, hydroxybenzoic acid, esters of this acid, or 2,5-di-tert-butyl-4-hydroxytoluene;

ii) lactams, such as ε-caprolactam, δ-valerolactam, γ-butyrolactam or β-propiolactam;

iii) active methylenic compounds, such as diethyl malonate, dimethyl malonate, ethyl or methyl acetoacetate, or acetylacetone;

iv) alcohols such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, glycolic acid, glycolic esters, lactic acid, lactic esters, methylolurea, methylolmelamine, diacetone alcohol, ethylenechlorohydrin, ethylenebromohydrin, 1,3-dichloro-2-propanol, 1,4-cyclohexyldimethanol or acetocyanohydrin;

v) mercaptans such as butyl mercaptan, hexyl mercaptan, t-butyl mercaptan, t-dodecyl mercaptan, 2-mercaptobenzothiazole, thiophenol, methylthiophenol or ethylthiophenol;

vi) acid amides such as acetoanilide, acetoanisidinamide, acrylamide, methacrylamide, acetamide, stearamide or benzamide;

vii) imides such as succinimide, phthalimide or maleimide;

viii) amines such as diphenylamine, phenylnaphthylamine, xylidine, N-phenylxylidine, carbazole, aniline, naphthylamine, butylamine, dibutylamine or butylphenylamine;

ix) imidazoles such as imidazole or 2-ethylimidazole;

x) ureas such as urea, thiourea, ethyleneurea, ethylenethiourea or 1,3-diphenylurea;

xi) carbamates such as phenyl N-phenylcarbamate or 2-oxazolidone;

xii) imines such as ethyleneimine;

xiii) oximes such as acetone oxime, formaldoxime, acetaldoxime, acetoxime, methyl ethyl ketoxime, diisobutylketoxime, diacetylmonoxime, benzophenone oxime or chlorhexanone oximes;

xiv) salts of sulfurous acid such as sodium bisulfite or potassium bisulfite;

xv) hydroxamic esters such as benzyl methacrylohydroxamate (BMH) or allyl methacrylohydroxamate; or xvi) substituted pyrazoles, imidazoles or triazoles; and also xvii) mixtures of these blocking agents, especially dimethylpyrazole and triazoles, malonic esters and acetoacetic esters, or dimethylpyrazole and succinimide.

The blocking agents are selected so that the blocked isocyanate groups only undergo deblocking, and enter into crosslinking reactions, in precisely the temperature range within which the thermal crosslinking of the coating material of the invention is to take place, in particular in the temperature range from 120 to 160° C.

Of the blocking agents described in detail above, the oximes xiii) in particular meet the aforementioned condition, so that they are used with particular preference in accordance with the invention. Of these, in turn, the ketoximes, especially methyl ethyl ketoxime, offer very particular advantages and are therefore used with very particular preference.

The blocking agents are preferably employed in stoichiometric amounts.

Where free isocyanate groups are still present in the resulting blocked polyurethane (B4), they are reacted in an optional fifth process step with at least one of the chain extenders described in detail above.

In terms of its method, the preparation of the binder component (B) for use in accordance with the invention has no special features but instead takes place with the customary and known methods of preparing polyurethanes preferably in an optionally water-miscible organic solvent or solvent mixture which is not reactive toward isocyanates. Examples of suitable solvents are ketones such as methyl ethyl ketone or methyl isobutyl ketone or cyclic amides such as N-methylpyrrolidone.

The binder component (B) for inventive use is present in the coating material of the invention advantageously in an amount of from 1 to 50%, preferably from 2 to 30%, with very particular preference from 2.5 to 20%, and in particular from 3 to 10%, by weight based in each case on the solids content of the coating material of the invention.

For its use as intended, the binder component (B) for inventive use is dispersed in an aqueous medium and, if desired, the organic solvents are removed by distillation.

The aqueous medium comprises substantially water. In this context the aqueous medium may already contain the further components of the coating material of the invention that are described in detail below, (A), (C), (D) and/or (E) and/or, in minor amounts, other dissolved solid, liquid or gaseous, organic and/or inorganic substances of low and/or high molecular mass. For the purposes of the present invention, the term "minor amount" refers to an amount which does not remove the aqueous nature of the aqueous medium.

The aqueous medium may also, however, comprise straight water.

It is of advantage in accordance with the invention to use straight water. Further advantages result if the solids content of the resulting dispersion of the binder component (B) for inventive use is from 10 to 60%, preferably from 20 to 55%, and in particular from 25 to 50%, by weight based in each case on the polyurethane dispersion (B).

As a further essential constituent the coating material of the invention comprises the water-dispersible, hydroxy-functional binder component (A) containing urethane groups.

A binder component (A) which can be used in the context of the invention is preparable, for example, by reacting a polyol or mixture of polyols having a number-average molecular weight of from 100 to 5000, preferably from 150 to 2000, with a polyisocyanate or mixture of polyisocyanates, the structure and proportions of the polyol and polyisocyanate being selected subject to the proviso that the binder component (A) preferably has an OH number of from 30 to 160, more preferably from 60 to 110.

Examples of suitable polyols and polyisocyanates are those described in detail above.

It is preferred if the polyol used to prepare the binder component (A) is a polyesterpolyol which preferably has a number-average molecular weight of from 250 to 5000, most preferably from 350 to 2000. Advantageously, the monomers for preparing such a polyesterpolyol are flexibilizing. Flexibilizing monomers may be selected, for example, from the group consisting of "adipic acid, dimer fatty acids and hexanediol".

Advantageous binder components (A) are obtained if use is also made of the compounds described in detail above by means of which stabilizing (potentially) ionic and/or nonionic functional groups are introduced, neutralizing agents and/or chain extenders.

In terms of its method, the preparation of the binder component (A) for use in accordance with the invention has no special features but instead takes place with the customary and known methods of preparing polyurethanes preferably in an optionally water-miscible organic solvent or solvent mixture which is not reactive toward isocyanates.

Examples of suitable solvents are ketones such as methyl ethyl ketone or methyl isobutyl ketone or cyclic amides such as N-methylpyrrolidone.

The binder component (A) for inventive use is present in the coating material of the invention advantageously in an amount of from 1 to 70%, preferably from 2 to 50%, with very particular preference from 3 to 40%, and in particular from 5 to 30%, by weight based in each case on the solids content of the coating material of the invention.

For its use as intended, the binder component (A) for inventive use is dispersed in an aqueous medium and, if desired, the organic solvents are removed by distillation.

The aqueous medium comprises substantially water. In this context the aqueous medium may already contain the further components of the coating material of the invention that are described in detail below, (C), (D) and/or (E), the above-described binder component (B) for inventive use and/or, in minor amounts, other dissolved solid, liquid or gaseous, organic or inorganic substances of low and/or high molecular mass.

It is of advantage in accordance with the invention to use straight water. Further advantages result if the solids content of the resulting dispersion of the binder component (A) for inventive use is from 10 to 60%, preferably from 20 to 55%, and in particular from 25 to 50%, by weight based in each case on the polyurethane dispersion (A).

As component (C) it is possible to use any water-dilutable amino resin. Suitable in this context is any amino resin suitable for surfacers, topcoat materials or transparent clearcoat materials, or a mixture of such amino resins, especially melamine-formaldehyde resins which are reactive toward OH groups at temperatures from 100° C. to 180° C., preferably from 120 to 160° C. For further details, refer to Römpp Lexikon Lacke und Druckfarben, Georg Thieme Verlag, 1998, page 29, "Amino resins", and the textbook "Lackadditive" [Additives for coatings] by Johan Bieleman, Wiley-VCH, Weinheim, N.Y., 1998, pages 242 ff., or to the book "Paints, Coatings and Solvents", second completely revised edition, edit. D. Stoye and W. Freitag, Wiley-VCH, Weinheim, N.Y., 1998, pages 80 ff. Also suitable are the customary and known water-dilutable amino resins some of whose methylol and/or alkoxymethyl groups have been defunctionalized by means of carbamate or allophanate groups. Amino resins of this kind are described, for example, in the patents U.S. Pat. No. 4,710,542 and EP-B-0 245 700 and also in the article by B. Singh and coworkers, "Carbamylmethylated Melamines, Novel Crosslinkers for the Coatings Industry" in Advanced Organic Coatings Science and Technology Series, 1991, volume 13, pages 193 to 207.

The water-dilutable amino resin (C) for inventive use is present in the coating material of the invention advantageously in an amount of from 1 to 50%, more preferably from 2 to 40%, with particular preference from 3 to 30%, and in particular from 4 to 20%, by weight based in each case on the solids content of the coating material of the invention.

The binder component (B) which can be used optionally advantageously has the following properties: number-average molecular weight of up to 5000, preferably from 500 to 3000, and OH number of between 50 and 300, preferably between 100 and 250. It is advantageous to use a component (D) which is composed at least in part of an epoxy-resin-modified, water-dilutable polyester preparable by (D1) using (D1.1) at least one polycarboxylic acid containing at least three carboxyl groups, or a reactive derivative of this acid, and/or (D1.2) at least one polyol containing at least one carboxyl group and (D1.3) at least one polycarboxylic acid containing two carboxyl groups, or a reactive derivative of this acid, and (D1.4) at least one polyol at least 10 mol %, preferably 30–70 mol %, of the components (D1.1), (D1.2), (D1.3) and (D1.4) used (based on (D1.1)+(D1.2)+(D1.3)+(D1.4)=100 mol %) containing at least one (cyclo)aliphatic structural element containing at least six carbon atoms to synthesize a polyester which has a number-average molecular weight of less than 2000, preferably from 500 to 1500, an acid number of from 35 to 240, preferably from 50 to 120, an OH number of from 56 to 320, preferably from 80 to 200, and in which all (D1.1) and (D1.3) components are incorporated by condensation via at least two carboxyl groups, and (D2) then reacting this polyester thus obtained with from 0.3 to 1.5, preferably from 0.5 to 1.0, equivalents per polyester molecule (D2.1) of an epoxy resin which has an epoxide equivalent weight of from 170 to 1000, preferably from 170 to 500, and is based on a bisphenol, preferably bisphenol A, and/or (D2.2) a derivative of this epoxy resin that contains at least one epoxide group per molecule under reaction conditions in which substantially only carboxyl groups react with epoxide groups, to give an epoxy-resin-modified polyester, which following (D3) neutralization of at least some of the free carboxyl groups is present in water-dilutable form.

A polyester of this kind is known from the reference EP 0 269 828 B1, to which reference is made for further details.

The carboxyl groups of the polyester are supplied by components (D1.1) and/or (D1.2). The polyester may be synthesized using the carboxyl group suppliers (D1.1) or (D1.2) alone or using a mixture of components (D1.1) and (D1.2).

Taking into account the abovementioned requirements, it is possible in principle as component (D1.1) to use any polycarboxylic acid which contains at least three carboxyl groups and is suitable for preparing polyesters, or a reactive derivative (e.g., anhydride, ester or halide) or a mixture of such acids and/or acid derivatives. Examples that may be mentioned include trimellitic acid, trimesic acid (1,3,5,-benzenetricarboxylic acid), pyromellitic acid and trimeric fatty acids. Trimellitic acid is used with preference.

Taking into account the abovementioned requirements, it is possible in principle to use as component (D1.2) any carboxyl-containing polyol suitable for preparing polyesters, or a mixture of such polyols, a polyol being understood to be an organic compound which carries at least two hydroxyl groups. Advantageously, dimethylolpropionic acid is used as (D1.2) component.

Taking into account the abovementioned requirements, it is possible in principle as component (D1.3) to use any polycarboxylic acid containing two carboxyl groups which is suitable for preparing polyesters, and/or a reactive derivative (e.g., anhydride, ester or halide) or a mixture of such acids and/or acid derivatives. Examples of suitable acids that may be mentioned are: phthalic acid, isophthalic acid, terephthalic acid, fumaric acid, maleic acid, endomethylene-tetrahydrophthalic acid, succinic acid, adipic acid, suberic acid, azelaic acid, sebacic acid and dimeric fatty acids. Preference is given to using phthalic acid, isophthalic acid, adipic acid, and dimeric fatty acids.

Taking into account the abovementioned requirements, it is possible in principle as component (D1.4) to use any polyol suitable for preparing polyesters, or a mixture of polyols, a polyol being understood to be an organic compound which carries at least two hydroxyl groups. Examples of suitable polyols are ethylene glycol, propanediols, butanediols, pentanediols. Neopentyl glycol, hexanediols, diethylene glycol, glycerol, trimethylolethane, trimethylolpropane, pentaerythritol, dipentaerythritol, neopentyl glycol hydroxypivalate, 2-methyl-2-propyl-1,3-propanediol, 2,2,4-trimethyl-1,3-pentanediol, and 2,2,5-trimethyl-1,6-hexanediol. Preference is given to using neopentyl glycol, 1,6-hexanediol, and neopentyl glycol hydroxypivalate.

The epoxy resins (D2.1) based on a bisphenol, preferably bisphenol A, generally comprise reaction products of bisphenols with epichlorohydrin. These epoxy resins are to have an epoxide equivalent weight of from 170 to 1000, preferably from 170 to 500, and to contain preferably on average from one to two, with particular preference two, epoxide groups per molecule.

It is also possible to use derivatives (D2.2) of these epoxy resins that contain at least one epoxide group per molecule. Suitable derivatives which may be used are reaction products, containing at least one epoxide group per molecule, of the abovementioned epoxy resins and a (cyclo) aliphatic monocarboxylic or polycarboxylic acid, preferably a monocarboxylic or polycarboxylic acid having a (cyclo) aliphatic structural element containing at least six carbon atoms. The derivatives may be prepared by reacting the epoxy resins in question with, for example, polymeric—preferably dimeric—fatty acids, adipic acid, azelaic acid, dodecanedicarboxylic acid, long-chain monocarboxylic acids, tetrahydrophthalic acid or hexahydrophthalic acid, so as to give reaction products which still contain at least one epoxide group per molecule.

Very particularly preferred water-dilutable polyesters are obtained if the polyester synthesized in stage (D1) was reacted with from 0.3 to 1.5, preferably from 0.5 to 1.0, equivalents per polyester molecule of a reaction product (D2.2) containing at least one epoxide group per molecule, being the reaction product of an epoxy resin based on a bisphenol, preferably bisphenol A, having an epoxide equivalent weight of from 170 to 1000, preferably from 170 to 500, and a (cyclo)aliphatic monocarboxylic or polycarboxylic acid containing a (cyclo)aliphatic structural element containing at least 18 carbon atoms, preferably a polymeric fatty acid, in particular a dimeric fatty acid.

Reaction between the polyester synthesized in stage (D1) with the epoxy resin or epoxy resin derivative (D2.1) and/or (D2.2) must be conducted such that essentially only the carboxyl groups of the polyester (D1) are reacted with the epoxide groups of the epoxy resin (D2) and such that competing reactions, such as the reaction of hydroxyl groups with epoxide groups, for example, proceed only to a minor extent.

Examples of suitable reaction conditions are as follows: reaction temperature 25–180° C., preferably 80–160° C. The reaction may be conducted in an inert solvent or in bulk and is advantageously catalyzed by basic catalysts, such as tertiary amines, for example.

Following neutralization (D3) of at least some of the carboxyl groups present in the epoxy-resin-modified polyester (D) using basic compounds, such as ammonia, aliphatic secondary and tertiary amines, such as diisopropanolamine, dimethyl- and diethylaminoethanol and also trimethyl-, triethyl- and tripropylamine, preferably tertiary amines, the epoxy-resin-modified polyester (D) is present in water-dilutable form.

The dispersion of the polyester (D) in an aqueous medium takes place as described above for the binder component (A) and (B). In this case, advantageously, the same or approximately the same solids contents are set.

In the coating material of the invention the polyester (D) may be present in an amount of from 1 to 50%, preferably from 2 to 40%, with particular preference from 3 to 30%, and in particular from 5 to 20%, by weight based in each case on the solids content of the coating material of the invention.

The coating material of the invention may further comprise customary coatings additives (E) in effective amounts. The nature and amount of the additives (E) are guided primarily by the intended use of the coating material of the invention. It is advantageous that these additives (E) are not volatile under the processing and application conditions of the coating material of the invention.

Where the coating material of the invention is used as topcoat material or aqueous basecoat material, it comprises color and/or effect pigments (E) in customary and known amounts. The pigments (E) may consist of organic or inorganic compounds and may impart effect and/or color. The coating material of the invention therefore ensures, owing to this large number of appropriate pigments (E), a universal breadth of use of the coating materials and permits the realization of a large number of color shades and optical effects.

As effect pigments (E) it is possible to use metal flake pigments such as commercially customary aluminum bronzes, aluminum bronzes chromated in accordance with DE-A-36 36 183, and commercially customary stainless steel bronzes, and also nonmetallic effect pigments, such as pearlescent pigments and interference pigments, for example. Examples of suitable inorganic color pigments (E) are titanium dioxide, iron oxides, Sicotrans yellow and carbon black. Examples of suitable organic color pigments are Indanthrene blue, Cromophthal red, Irgazine orange, and Heliogen green.

Furthermore, the coating material of the invention may comprise organic and inorganic fillers (E) in customary and known, effective amounts. Examples of suitable fillers are titanium dioxide, carbon black, graphite, chalk, calcium sulfates, barium sulfate, silicates such as talc or kaolin, silicas such as Aerosil®, oxides such as aluminum hydroxide, iron oxides or magnesium hydroxide, or organic fillers such as textile fibers, cellulose fibers, polyethylene fibers or wood flour. For further details, refer to Römpp Lexikon Lacke und Druckfarben, Georg Thieme Verlag, 1998, pages 250 ff., "Fillers".

The coating materials of the invention that are used to produce surfacers or antistonechip primers contain these pigments and/or fillers (E) advantageously in an amount of from 10 to 80%, preferably from 15 to 70%, with particular preference from 20 to 65%, and in particular from 25 to 60%, by weight based in each case on the overall solids content of the inventive coating material.

The abovementioned additives (E) are omitted if the coating materials of the invention are used as clearcoat materials.

Examples of suitable additives (E) which may be present both in the inventive clearcoat materials and also in the topcoat, aqueous basecoat materials and surfacers and antistonechip primers are UV absorbers;

free-radical scavengers;

crosslinking catalysts;

slip additives;

polymerization inhibitors;

defoamers;

emulsifiers, especially nonionic emulsifiers such as alkoxylated alkanols and polyols, phenols and alkylphenols, or anionic emulsifiers such as alkali metal salts or ammonium salts of alkanecarboxylic acids, alkanesulfonic acids, and sulfo acids of alkoxylated alkanols and polyols, phenols and alkylphenols;

wetting agents such as siloxanes, fluorine compounds, carboxylic monoesters, phosphoric esters, polyacrylic acids and their copolymers, or polyurethanes;

adhesion promoters;

leveling agents;

film formation auxiliaries such as cellulose derivatives;

flame retardants;

low molecular mass, oligomeric, and high molecular mass reactive diluents which are able to participate in the thermal crosslinking, especially polyols such as tricyclodecanedimethanol, dendrimeric polyols, hyperbranched polyesters, polyols based on metathesis oligomers or branched alkanes having more than eight carbon atoms in the molecule;

high-boiling organic solvents ("long solvents");

rheology control additives, such as those known from the patents WO 94/22968, EP-A-0 276 501, EP-A-0 249 201 or WO 97/12945; crosslinked polymeric microparticles, such as are disclosed, for example, in EP-A-0 008 127; inorganic phyllosilicates such as aluminum magnesium silicates, sodium magnesium phyllosilicates and sodium magnesium fluorine lithium phyllosilicates of the montmorillonite type; silicas such as Aerosils; or synthetic polymers containing ionic and/or associative groups such as polyvinyl alcohol, poly (meth)acrylamide, poly(meth)acrylic acid, polyvinylpyrrolidone, styrene-maleic anhydride copolymers or ethylene-maleic anhydride copolymers and their derivatives, or hydrophobically modified ethoxylated urethanes or polyacrylates; or crosslinking agents such as compounds or resins containing anhydride groups, compounds or resins containing epoxide groups, tris(alkoxycarbonyl-amino) triazines, compounds or resins containing carbonate groups, blocked and/or nonblocked polyisocyanates, beta-hydroxyalkylamides, and also compounds containing on average at least two groups capable of transesterification, examples being reaction products of malonic diesters and polyisocyanates or of esters and partial esters of polyhydric alcohols of malonic acid with monoiso-cyanates, such as are described in the European patent EP-A-0 596 460.

Further examples of suitable coatings additives are described in the textbook "Lackadditive" [Additives for coatings] by Johan Bieleman, Wiley-VCH, Weinheim, N.Y., 1998.

Where used, these additives (E), which may be present not only in the clearcoat materials of the invention but also in the topcoat materials, aqueous basecoat materials, and surfacers and antistonechip primers, are present in the coating material of the invention advantageously in an amount of up to 40%, preferably up to 30%, with particular preference up to 20%, and in particular up to 10%, by weight based in each case on the solids content of the coating material of the invention.

The invention further teaches a process for preparing an above-described coating material of the invention, in which components (A), (B) and (C) and also, where used, (D) are prepared separately, and where components (A), (B) and (C) and also, where used, (D) are mixed and homogenized to give the ready-to-apply coating material. In detail, the component (A) may be prepared as a pigment paste prior to mixing with components (B) and (C) and also, where used, (D). Components (A) and (B) and also, where used, (C) are usually prepared in the form of aqueous dispersions prior to mixing, the dispersion containing component (A) preferably being free from solvents.

Component (E) may either be admixed to one of components (A), (B) and (C) and also, where used, (D) before these components are mixed, to give a pigment paste, or may be admixed, preferably in the form of a pigment paste, to the coating material in the course of the mixing of components (A), (B) and (C) and also, where used, (D).

The coating material of the invention is suitable for producing single-coat or multicoat coating systems which absorb mechanical energy and/or provide color and/or effect on primed or unprimed substrates. It is also suitable for producing single-coat or multicoat clearcoat systems on primed or unprimed substrates or on the single-coat or multicoat, coating systems which absorb mechanical energy and/or impart color and/or effect.

Suitable substrates include all article surfaces to be coated which are amenable to curing of the paint films present thereon using heat; that is, for example, articles made of metals, plastics, wood, ceramic, stone, textile, fiber composites, leather, glass, glass fibers, glass wool and rock wool or mineral-bound and resin-bound building materials, such as plasterboard panels and cement slabs or roofing tiles. Accordingly, the coating material is highly suitable for applications in automotive finishing the varnishing of furniture, and industrial coating, including coil coating and container coating. In the context of the industrial coatings it is suitable for coating virtually all parts for private or industrial use such as radiators, domestic appliances, small metal parts, hub caps or wheel rims.

The coating material of the invention is especially suitable for producing paint systems which absorb mechanical energy without being destroyed in the process.

The invention accordingly teaches in particular the use of the coating material of the invention for producing a surfacer coat and/or an antistonechip primer on a primed or unprimed substrate and also for producing a coated metallic substrate, preferably a coated motor vehicle body or a coated motor vehicle body component. In one process for producing a coated substrate it is preferred if first of all one primer, preferably an electrodeposition primer, is applied to the substrate and baked and then the coating material of the invention is applied thereto and baked, after which a preferably aqueous basecoat material is applied and, after flashing off if desired, is optionally overcoated with a clearcoat material, preferably a two-component clearcoat material, and, in the case of overcoating with a clearcoat material, said clearcoat material is baked "wet on wet" together with the basecoat material.

In this context, the coating material of the invention is applied in a wet film thickness such that after curing there results in the finished surfacer coat of the invention or the antistonechip primer of the invention a dry film thickness of from 5 to 100, preferably from 10 to 75, with particular preference from 15 to 55, and in particular from 15 to 40, $\mu$m.

The coating material of the invention may be applied by any customary application method, such as spraying, knife coating, brushing, flow coating, dipping or rolling, for example. It is preferred to employ spray application methods, such as compressed air spraying, airless spraying, high-speed rotation, electrostatic spray application (ESTA), alone or in conjunction with hot spray application such as hot air spraying, for example. Applications may be conducted at temperatures of max. 70 to 80° Celsius, so that suitable application viscosities are achieved without any change in or damage to the coating material and its overspray (which may be intended for reprocessing) occurring during the short period of thermal stress. For instance, hot spraying may be configured in such a way that the coating material is heated only very briefly in the spray nozzle or shortly before the spray nozzle.

The spray booth which is used for application may be operated, for example, with an optionally temperature-controllable circulation which is operated with a suitable absorption medium for the overspray, an example being the coating material itself.

The thermal curing also has no special features in terms of its method but instead takes place in accordance with the customary and known methods such as heating in a forced air oven or exposure to IR lamps. Advantageously, the thermal curing takes place at a temperature of from 100 to 180° C. and with particular preference from 120 to 160° C. for a time of from 1 min up to 2 h, with particular preference from 2 min up to 1 h, and in particular from 3 min to 30 min. Where substrates are used which are able to withstand high thermal loads, thermal crosslinking may also be conducted at temperatures above 180° C. In general, however, it is advisable not to exceed temperatures of 180° C., and preferably not to exceed temperatures of 160° C.

The surfacer coats or antistonechip primers of the invention have an outstanding, balanced profile of properties in which even divergent properties such as, for example, very good multiple impact and single impact, low film thickness and very good filling power/topcoat appearance, low baking temperature and very good topcoat appearance, and low baking temperature and high adhesion are realized simultaneously.

EXAMPLES AND COMPARATIVE EXPERIMENT

Example 1
Preparation of a Component A

Example 1.1
Preparation of a Polyesterpolyol A1

492 g of adipic acid, 559 g of isophthalic acid and 1192 g of hexanediol were weighed into a reactor equipped with stirrer, column and oil heating and were slowly heated to 220° C. The water of reaction eliminated was distilled off from the reaction mixture via a column. The reaction was continued until an acid number of the solid resin of <5 is reached. The finished polyester has a viscosity of 1.9 dPas measured in 70% dilution in butyl glycol.

Example 1.2
Preparation of a Polyurethane Dispersion A2

444 g of 4,4-dicyclohexylmethane diisocyanate (Desmodur W from Bayer), 57 g of dimethylolpropionic acid, 44 g of neopentyl glycol and 185 g of N-methylpyrrolidone were weighed into a reactor with stirrer, reflux condenser and oil heating and were heated to 100° C. The NCO group content was determined hourly. At an NCO content of 9.74% in the solution, it was cooled to 85° C. and 1037 g of the polyester described under example 1.1 were added. The mixture was reheated to 100° C. and the reaction was continued with measurement of the NCO content. When the NCO content of the solution was less than 0.2%, it was cooled to 85° C. and 37 g of dimethylethanolamine were added for neutralizing the carboxyl groups. Then 1900 g of water were added. The resulting polyurethane dispersion had a solids of 40% (measured in a forced air oven for 60 min at 130° C.), an acid number of 19.2 and a pH of 8.3 (measured in 2:1 dilution in water).

Example 2
Preparation of a Component B 631.2 g of a polyesterdiol made from isophthalic acid, dimer fatty acid and hexanediol (number-average molecular weight Mn about 1400) and 60.4 g of dimethylolpropionic acid were reacted with 354.4 g of 4,4-dicyclohexylmethane diisocyanate (Desmodur W from Bayer) in 448.2 g of ethyl methyl ketone at 80° C. until the NCO content was constant. Then 33.1 g of diethanolamine were added and the reaction mixture was held at 80° C. with stirring for 2 hours. After the temperature had been lowered to 60° C., 108.9 g of trimerized hexamethylene diisocyanate (Basonat® HI 100 from BASF) and 54.4 g of methyl ethyl ketoxime were added and stirring was continued at 60° C. for 30 minutes. Then a further 33.1 g of methyl ethyl ketoxime were added. The reaction mixture is held at 60° C. for 1 hour more and then 20.0 g of diethanolamine and 20 g of methyl ethyl ketone are added for chain extension. After the exothermic reaction had subsided, the temperature was held at 80° C. until an NCO content of <0.1% was reached. The product at this point had a cone-and-plate viscosity of 3.0–6.0 dpas, measured in 1:1 dilution with N-methylpyrrolidone at 23° C. and 1000 s$^{-1}$. Then 121 g of butyl glycol were added. 70% of the carboxyl groups present were then neutralized with diethanolamine at 80° C. and 1972 g of distilled water were added over the course of one hour, with vigorous stirring, and component (B) was dispersed therein. Thereafter, the methyl ethyl ketone was distilled off in vacuo and the dispersion was adjusted to a solids content of 37%.

Example 3
Preparation of a Component D 442.4 g of hexanediol and 166.6 g of a technical-grade dimeric fatty acid (dimer content at least 80%, trimer content not more than 20%) were weighed into a reactor equipped with stirrer, column and oil heating and were slowly heated to 130° C. Then a further 184.3 g of isophthalic acid were added and heating was continued to 220° C. The water of reaction eliminated was distilled off from the reaction mixture via a column. The reaction was continued until an acid number of 10.5 is reached. Following cooling to 140° C., 266.7 g of trimellitic anhydride were added in portions with stirring. The mixture was then heated to 150° C. and subjected to esterification until an acid number of 67.7 had been reached. It was then cooled to 120° C. and diluted with butyl glycol so as to give a solution having a solids content of 85%. The 85% polyester solution was heated to 140° C. and admixed in portions with 209.6 g of an epoxy resin made from bisphenol A and epichlorohydrin, having an epoxy equivalent weight of 490. Reaction was then carried out at 140° C. until an acid number of 42.1 and an epoxy equivalent of more than 50 000 had been reached. The product was then cooled to below 100° C. and neutralized with 64.6 g of NN-dimethylethanolamine. The reaction material was then run off with vigorous stirring into 2000 g of deionized water which had been heated to 60° C. beforehand. Finally, the dispersion was adjusted to a solids content of 35% and a pH of 7.5.

Example 4
Preparation of the Pigment Dispersion of an Inventive Surfacer 400 g of the polyurethane dispersion described under example 1, 7.4 g of Aerosil® R972 (Degussa), 33 g of Bayferrox 3910® (Bayer), 100 g of talc 10MO (TDL), 204 g of Ti-pure® R900 (Du Pont), 26.2 g of Sicomixschwarz® 6190 (BASF), 60 g of Blancfix® N (Sachtleben) and 140 g of deionized water were treated in a dissolver for 30 minutes and then ground to a fineness of 12–15 µm in a commercial bead mill operated in circulation mode. The temperature during grinding was at least 30° C., maximum 60° C. At least 7 theoretical circuits were run.

Example 5
Preparation of an Inventive Aqueous Surfacer

To 970.6 g of the pigment dispersion from example 4 there were added 7.6 g of Additol® XW 395 (Vianova Resins), 408 g of the aqueous polyester described under example 3, 188 g of the aqueous polyurethane dispersion described under example 2, 136 g of a water-dilutable methanol-etherified melamine resin, 100 g of the aqueous polyurethane dispersion described under example 1, 0.6 g of dimethylethanolamine, 20 g of butyl glycol, 20 g of butyl diglycol, 44 g of Byketol® WS (Byk Chemie) and 45.8 g of deionized water, with stirring. After the final item, homogenization was carried out for 1 hour. The composition was adjusted with dimethylethanolamine to a pH of 7.5 and with deionized water to a viscosity of 60–100 s DIN 4 (Ford Cup). For application, a processing viscosity of 30 s DIN 4 was set using deionized water.

Example 6
Preparation of a Pigment Dispersion of an Aqueous Surfacer (Comparative Example)

400 g of the aqueous polyester described under example 3., 7.4 g of Aerosil® R972 (Degussa), 33 g of Bayferrox® 3910 (Bayer), 100 g of talc 10MO (TDL), 204 g of Ti-pure® R900 (Du Pont), 26.2 g of Sicomixschwarz® 6190 (BASF), 60 g of Blancfix® N (Sachtleben) and 140 g of deionized water were treated in a dissolver for 30 minutes and then ground to a fineness of 12–15 µm in a commercial bead mill operated in circulation mode. The temperature during grinding was at least 30° C., maximum 60° C. At least 7 theoretical circuits were run.

Example 7
Preparation of an Aqueous Surfacer (Comparative Experiment)

To 970.6 g of the pigment dispersion from example 6 there were added 7.6 g of Additol® XW 395 (Vianova Resins), 508 g of the aqueous polyester described under example 3, 188 g of the aqueous polyurethane dispersion described under example 2, 136 g of a water-dilutable methanol-etherified melamine resin, 0.6 g of dimethylethanolamine, 20 g of butyl glycol, 20 g of butyl diglycol, 44 g of Byketol® WS (Byk Chemie) and 45.8 g of deionized water, with stirring. After the final item, homogenization was carried out for 1 hour. The composition was adjusted with dimethylethanolamine to a pH of 7.5 and with deionized water to a viscosity of 60–100 s DIN 4 (Ford Cup). For application, a processing viscosity of 30 s DIN 4 was set using deionized water.

Example 9
Test Results

The coating materials prepared in this way were subjected to tests for the properties of surfacer coats produced using them. The properties of the surfacer coats were tested in a multicoat system familiar to the skilled worker, which can be produced from a commercial electrocoat, the inventive aqueous surfacer from example 5 or the comparative surfacer from example 7, a commercial aqueous basecoat material and a commercial 2K clearcoat material, the aqueous basecoat material and the 2K clearcoat material being applied by the technique known as the wet-on-wet technique without baking in between.

The results of the tests can be found in the table.

TABLE

Test results

| Properties | Example 5 | Example 7 |
|---|---|---|
| Example 9.1: Application of the surfacer in a film thickness of 20 µm, baking temperature 155° C. | | |
| Ball shot (material removed in mm)[a] | 6 | 8 |
| Multiple impact VDA (rating)[b] | 2 | 2 |
| Topcoat appearance (rating)[c] | 2 | 3 |
| Adhesion GT2 (rating)[d] | 0 | 2 |
| Example 9.2: Application of the surfacer in a film thickness of 35 µm, baking temperature 155° C. | | |
| Ball shot (material removed in mm)[a] | 8 | 13 |
| Multiple impact VDA (rating)[b] | 2 | 2 |
| Topcoat appearance (rating)[c] | 2 | 3 |
| Adhesion GT2 (rating)[d] | 0 | 2 |

Rating: 0 = good, 5 = poor
[a] Paint test procedure LPV 2007.40.70.01 from Daimler Chrysler
[b] Paint test procedure LPV 2007.40.70.05 from Daimler Chrysler
[c] Visual assessment
[d] Cross-cut test in accordance with ISO 2409: 1994-10

Comparison of the respective test results shows that only the inventive coating material of example 5 at baking temperatures below 160° C. gives a surfacer which passes both the multiple impact and the single impact tests with distinction and which even at comparatively low film thickness exhibits very good topcoat appearance and very good adhesion.

What is claimed is:

1. A method for making an aqueous coating material comprising:
   I. forming a water-dispersible binder component that contains groups comprising urethane groups and blocked isocyanate groups by a method comprising:
      (1) reacting at least one polyol and at least one first polyisocyanate to form a polyurethane prepolymer that contains groups comprising isocyanate groups,
      (2) reacting the polyurethane prepolymer that contains groups comprising isocyanate groups with a first chain extender to give a hydroxyl-containing, chain-extended polyurethane prepolymer,
      (3) reacting the hydroxyl-containing, chain-extended polyurethane prepolymer with at least one second polyisocyanate to give a further polyurethane prepolymer that contains groups comprising isocyanate groups, and
      (4) blocking at least a portion of the isocyanate groups of the chain-extended polyurethane prepolymer that contains groups comprising isocyanate groups with a blocking agent to give a polyurethane that contains groups comprising blocked isocyanate groups, and if there are free isocyanate groups remaining,
      (5) reacting remaining free isocyanate groups in the polyurethane with a second chain extender, adding water to the polyurethane; and II. mixing the water-dispersible binder component with
  (A) a water-dispersed hydroxy-functional binder component that contains groups comprising urethane groups,
  (B) a water-dispersible amino resin,
  (C) optionally, a coatings additive, and
  (D) optionally, a water-dispersible hydroxy-functional polyester.

2. The method of claim 1, wherein the water-dispersible hydroxy-functional binder component has an OH number of from 30 to 160 mg KOH/g.

3. The method of claim 1, wherein the water-dispersible hydroxy-functional binder component has a number-average molecular weight of from 500 to 20,000.

4. The method of claim 1, wherein the water-dispersible hydroxy-functional binder component comprises a reaction product of at least one polyol having a number-average molecular weight of from 100 to 5,000 with at least one polyisocyanate the structure and proportions of the polyol and polyisocyanate being selected subject to the proviso that the water-dispersible hydroxy-functional binder component has an OH number of from 30 to 160 mg KOH/g.

5. The method of claim 4, wherein the polyol is a polyesterpolyol.

6. The method of claim 5, wherein the polyesterpolyol comprises a reaction product of adipic acid, at least one dimer fatty acid, and hexanediol.

7. The method of claim 1, wherein the polyol comprises a reaction product of isophthalic acid, at least one dimer fatty acid, and hexanediol.

8. The method of claim 1, wherein the polyol has a number-average molecular weight of from 1,000 to 2,000.

9. The method of claim 1, wherein the first polyisocyanate and the second polyisocyanate are each independently at least one of a diisocyanate adduct that contains at least one isocyanurate group and a diisocyanate.

10. The method of claim 1, wherein the blocking agent is an oxime.

11. The method of claim 1, wherein the amino resin is a melamine-formaldehyde resin that is reactive toward OH groups at temperatures of from 100° C. to 180° C.

12. The method of claim 1, wherein the water-dispersible hydroxy-functional polyester comprises at least in part an epoxy-resin-modified, water-dilutable polyester comprising a reaction product of i) a polyester and ii) an epoxy resin in an amount from 0.3 to 1.5 equivalents per polyester molecule,
  (D1) wherein the polyester comprises a reaction product of
    (D1.1) one of at least one polycarboxylic acid that contains groups comprising at least three carboxyl groups and at least one reactive derivative of this polycarboxylic acid, and
    (D1.2) optionally, at least one polyol that contains groups comprising at least one carboxyl group and
    (D1.3) one of at least one polycarboxylic acid that contains groups comprising two carboxyl groups, and at least one reactive derivative of this polycarboxylic acid, and
    (D1.4) at least one polyol,
    wherein in structural units of a combined amount of (D1.1), (D1.2), (D1.3) and (D1.4) comprises at least 10 mol % of at least one (cyclo)aliphatic structural element comprising at least six carbon atoms,
    wherein the polyester has a number-average molecular weight of less than 2,000, an acid number of from 35 to 240 mg KOH/g, an OH number of from 56 to 320 mg KOH/g, and in which all (D1.1) and (D1.3) are incorporated by condensation via at least two carboxyl groups;
  (D2) wherein the epoxy resin comprises at least one of
    (D2.1) an epoxy resin that has an epoxide equivalent weight of from 170 to 1,000 and is based on a bisphenol and
    (D2.2) a derivative of this epoxy resin that contains at least one epoxide group per molecule;
  wherein, in the reaction, substantially only carboxyl groups react with epoxide groups to give an epoxy-resin-modified polyester, and wherein at least a portion of free carboxyl groups are neutralized such that the water-dispersible hydroxy-functional polyester is water-dilutable.

13. The method of claim 1 further comprising applying one coat of the coating material to a primed or unprimed substrate.

14. The method of claim 13, wherein the coat is at least one of a surfacer coat, an antistonechip coat, a color topcoat, an effect topcoat, a color and effect topcoat, an aqueous basecoat, and a clearcoat, and wherein the at least one coat is an energy-absorbing paint system.

15. The method of claim 1, wherein at least two of:
  I. the water-dispersible hydroxy-functional binder component has an OH number of from 30 to 160 mg KOH/g;
  II. the water-dispersible hydroxy-functional binder component has a number-average molecular weight of from 500 to 20,000;
  III. the water-dispersible hydroxy-functional binder component comprises a reaction product of at least one polyol having a number-average molecular weight of from 100 to 5,000 with at least one polyisocyanate the structure and proportions of the polyol and polyisocyanate being selected subject to the proviso that the water-dispersible hydroxy-functional binder component has an OH number of from 30 to 160 mg KOH/g;
  IV. the polyol comprises a reaction product of isophthalic acid, at least one dimer fatty acid, and hexanediol;
  V. the polyol has a number-average molecular weight of from 1,000 to 2,000;
  VI. the first polyisocyanate and the second polyisocyanate are each independently at least one of a diisocyanate adduct that contains at least one isocyanurate group and a diisocyanate;
  VII. the blocking agent is an oxime;
  VIII. the amino resin is a melamine-formaldehyde resin that is reactive toward OH groups at temperatures of from 100° C. to 180° C.; and
  IX. the water-dispersible hydroxy-functional polyester comprises at least in part an epoxy-resin-modified, water-dilutable polyester comprising a reaction product of i) a polyester and ii) an epoxy resin in an amount from 0.3 to 1.5 equivalents per polyester molecule,
    (D1) wherein the polyester comprises a reaction product of
      (D1.1) one of at least one polycarboxylic acid that contains groups comprising at least three carboxyl groups and at least one reactive derivative of this polycarboxylic acid, and
      (D1.2) optionally, at least one polyol that contains groups comprising at least one carboxyl group and
      (D1.3) one of at least one polycarboxylic acid that contains groups comprising two carboxyl groups, and at least one reactive derivative of this polycarboxylic acid, and (D1.4) at least one polyol, wherein in structural units of a combined amount of (D1.1), (D1.2), (D1.3) and (D1.4) comprises at least 10 mol % of at least one (cyclo)aliphatic structural element comprising at least six carbon atoms, wherein the polyester has a number-average molecular weight of less than 2,000, an acid number of from 35 to 240 mg KOH/g, an OH number of from 56 to 320 mg KOH/g, and in which all (D1.1) and (D1.3) are incorporated by condensation via at least two carboxyl groups;

(D2) wherein the epoxy resin comprises at least one of (D2.1) an epoxy resin that has an epoxide equivalent weight of from 170 to 1,000 and is based on a bisphenol and (D2.2) a derivative of this epoxy resin that contains at least one epoxide group per molecule;

wherein, in the reaction, substantially only carboxyl groups react with epoxide groups to give an epoxy-resin-modified polyester, and wherein at least a portion of free carboxyl groups are neutralized such that the water-dispersible hydroxy-functional polyester is water-dilutable.

16. The method of claim 15 further comprising applying one coat of the coating material to a primed or unprimed substrate.

17. The method of claim 16, wherein the coat is at least one of a surfacer coat, an antistonechip coat, a color topcoat, an effect topcoat, a color and effect topcoat, an aqueous basecoat, and a clearcoat, and wherein the at least one coat is an energy-absorbing paint system.

* * * * *